United States Patent [19]
Jones

[11] 3,762,993
[45] Oct. 2, 1973

[54] APPARATUS FOR DETECTING REACTOR FUEL TUBE FAILURES

[75] Inventor: Cecil R. Jones, San Jose, Calif.

[73] Assignee: Transfer Systems Incorporated, New York, N.Y.

[22] Filed: June 24, 1971

[21] Appl. No.: 156,446

[52] U.S. Cl............................ 176/19 R, 176/19 LD
[51] Int. Cl............................................. G21c 17/02
[58] Field of Search........................ 176/19 R, 19 LD

[56] References Cited
UNITED STATES PATENTS

| | | | |
|---|---|---|---|
| 3,357,891 | 12/1967 | Wadmark | 176/19 R |
| 3,069,339 | 12/1962 | Jacobs | 176/19 LD |
| 3,575,802 | 4/1971 | Gelius | 176/19 R |
| 3,300,388 | 1/1967 | Jerman et al. | 176/19 R |

FOREIGN PATENTS OR APPLICATIONS

| | | | |
|---|---|---|---|
| 769,153 | 10/1962 | Canada | 176/19 LD |
| 871,944 | 7/1961 | Great Britain | 176/19 LD |
| 621,363 | 8/1961 | Belgium | 176/19 LD |

OTHER PUBLICATIONS

R. N. Osborne, July 1961 Nucleonics, pp. 84, 86, 89.

Primary Examiner—Reuben Epstein
Attorney—Jack Oisher

[57] ABSTRACT

Apparatus for detecting reactor fuel element failures within an assembly of fuel elements in which a sampling device with a test chamber is disposed over an assembly of sealed fuel elements after a nuclear power plant has been shut down and preparation for fuel removal has been completed. Air is conducted through the sampling device to displace the coolant, such as water, in the test chamber above the assembly of fuel elements and to inhibit the circulation of the coolant about the assemblies of fuel elements. As a consequence thereof, the fuel elements of an assembly of fuel elements become heated and fission products are emitted from the defective fuel elements to cause an increase of radio-activity in the water about the assembly of fuel elements. Coolant within or about the assembly of fuel elements is then removed by the sampling device and conducted to a sampling station. At the sampling station is a vial containing a chemical to concentrate the fission products such as an iodine getter, which is exposed to the coolant conducted to the sampling station. The vials containing sample coolant concentrate are moved from the sampling station to a gamma scanner. The gamma scanner senses the activity level of the selected isotope contained in the coolant sample, which is used for detecting the failure of fuel elements within an assembly of fuel elements.

5 Claims, 5 Drawing Figures

United States Patent [19]
Jones
[11] 3,762,993
[45] Oct. 2, 1973
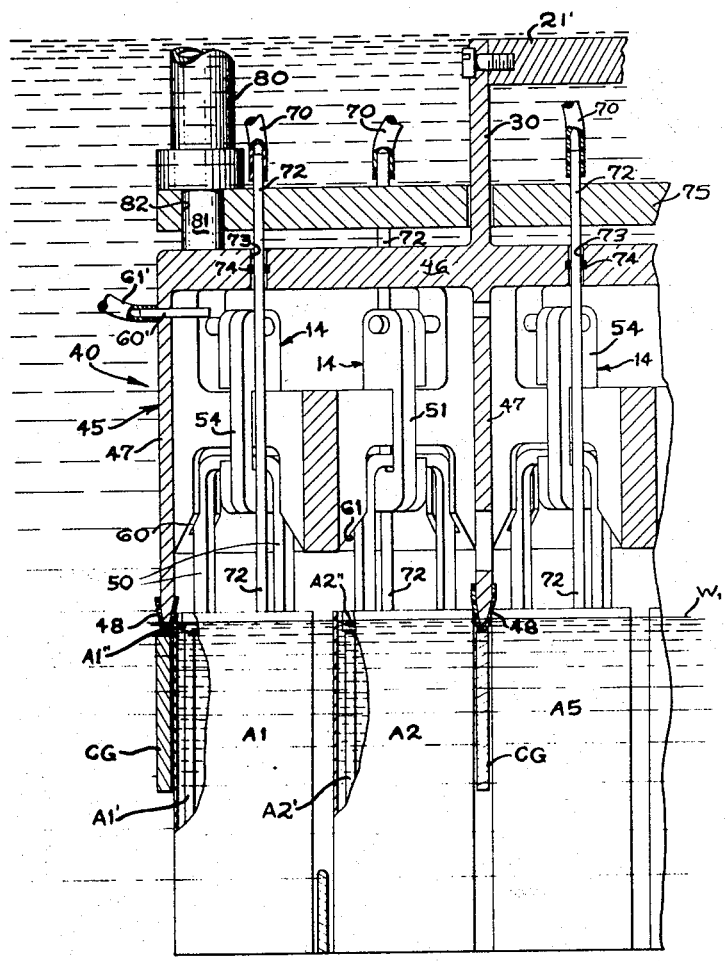

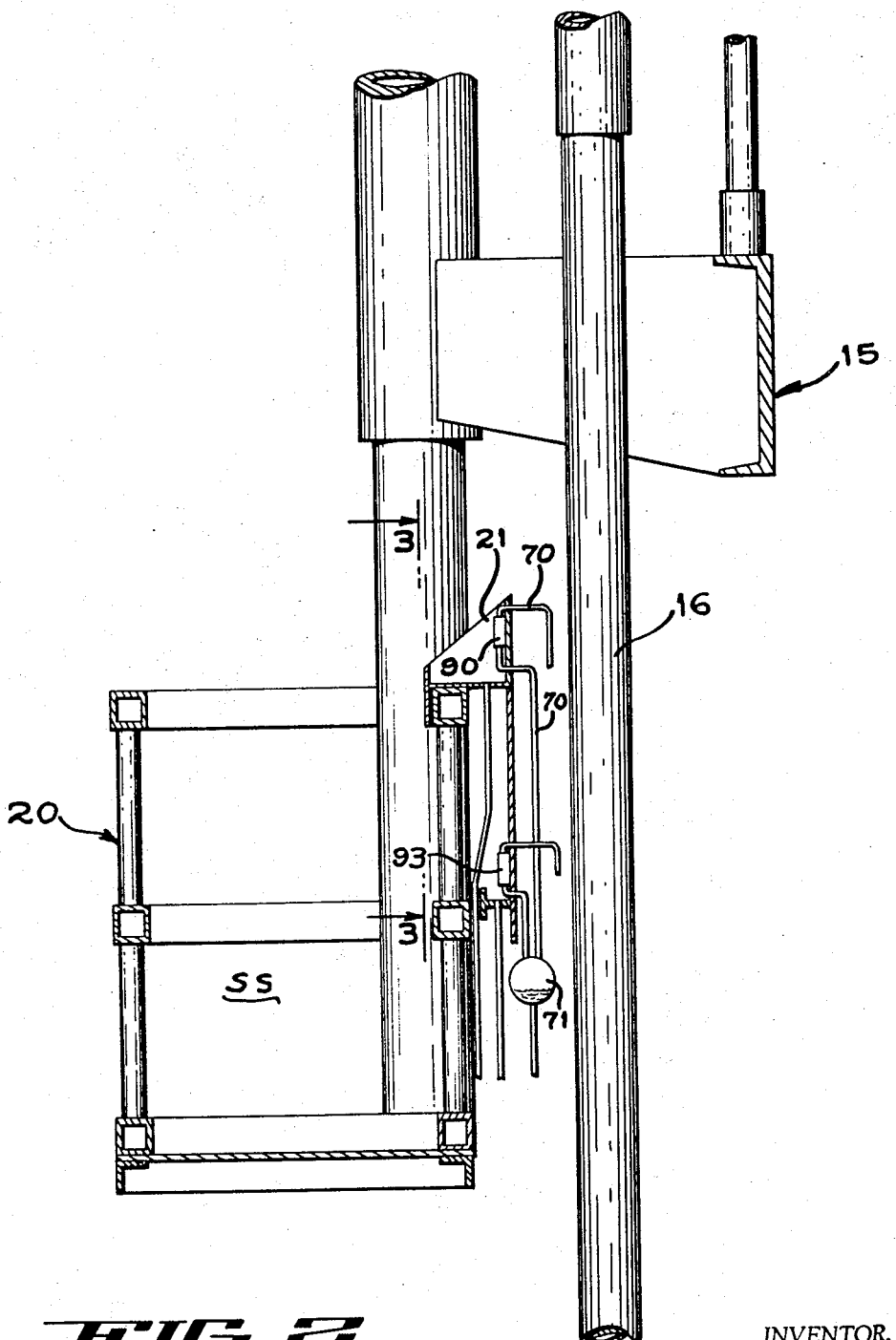

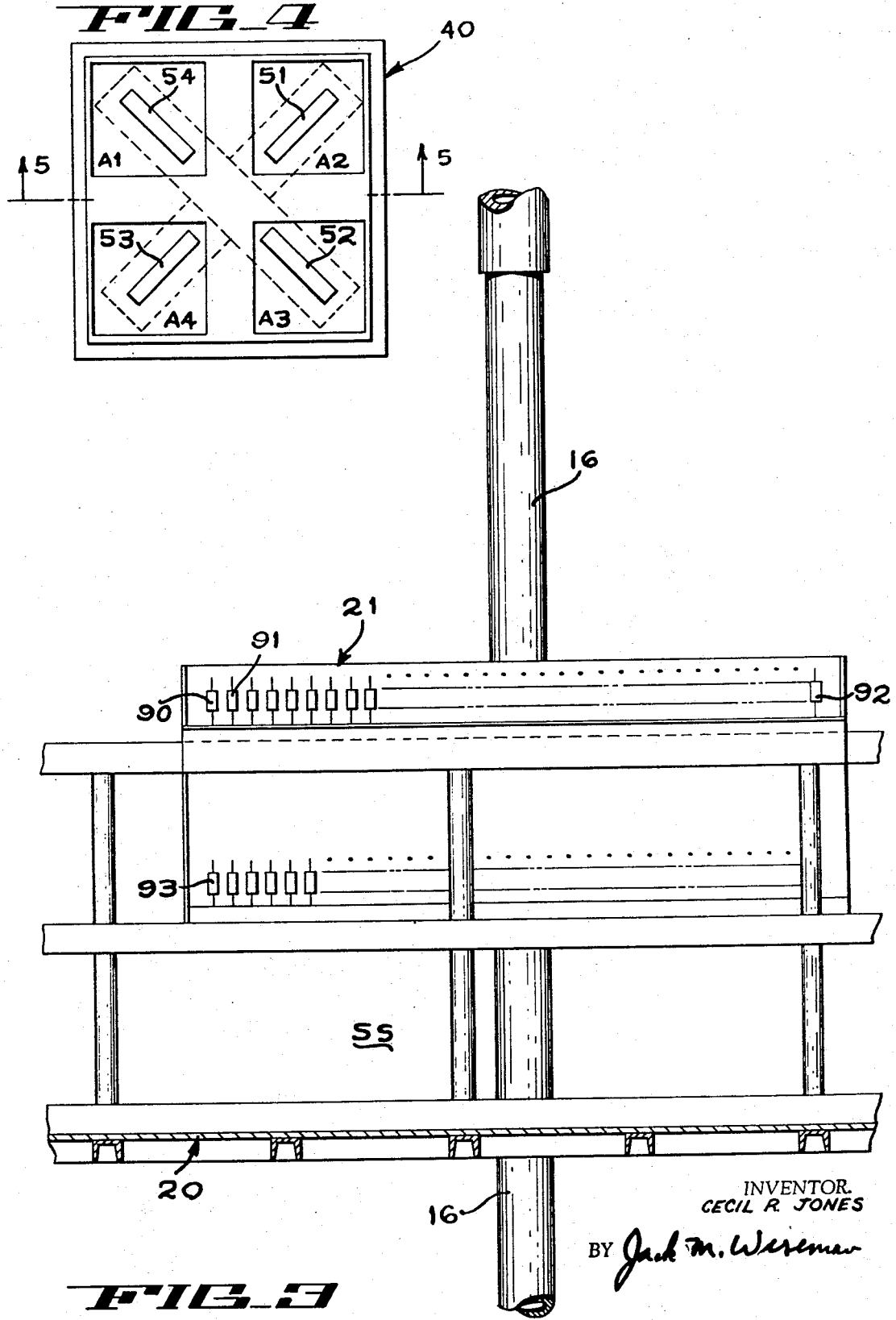

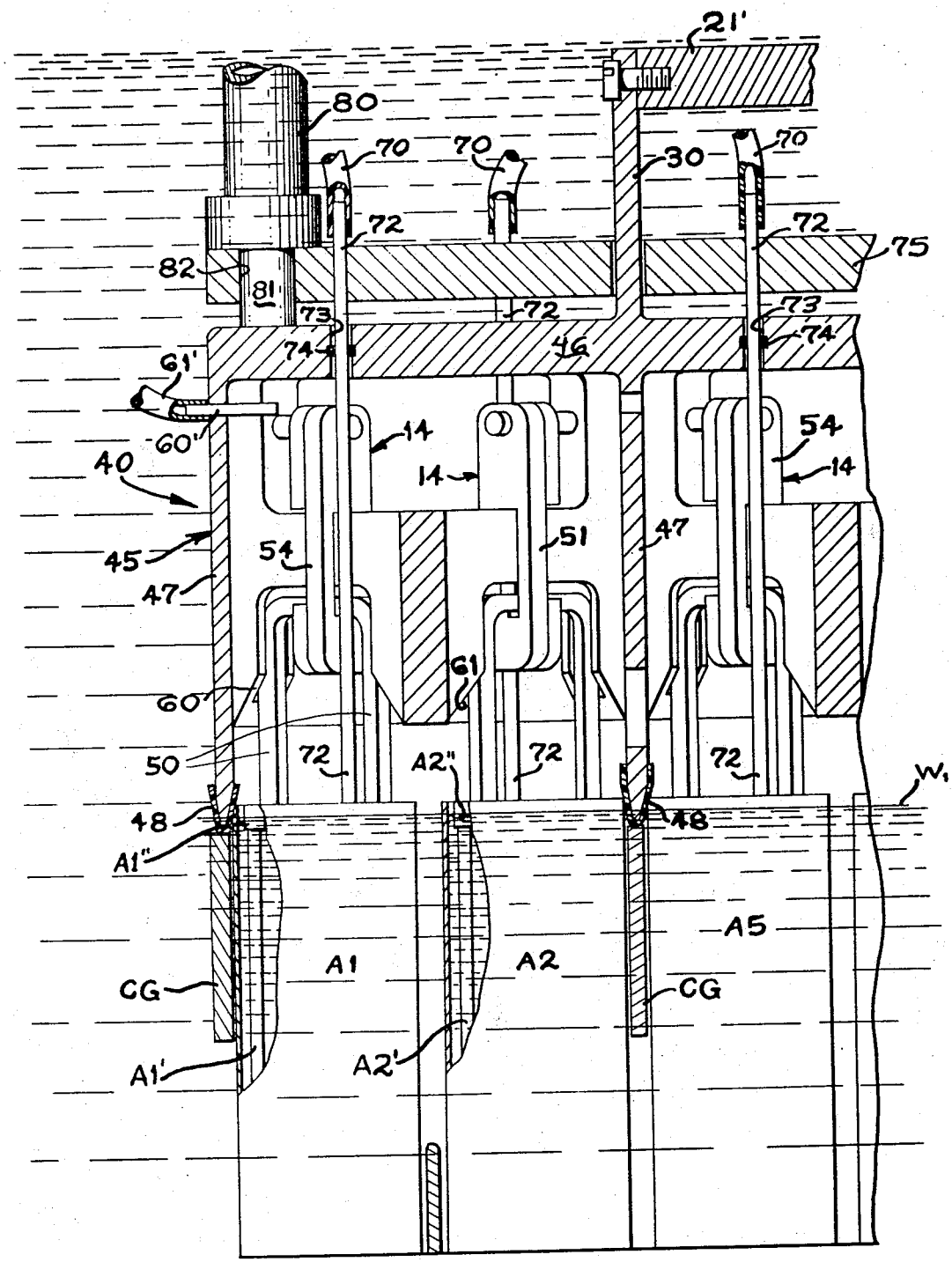
FIG_5

APPARATUS FOR DETECTING REACTOR FUEL TUBE FAILURES

BACKGROUND OF THE INVENTION

The present invention relates in general to auxiliary apparatus for nuclear power plants, and more particularly to apparatus for detecting reactor fuel element failure.

Nuclear fuel, such as uranium oxide pellets, are kept within a fuel element. An array of such fuel elements form an assembly of fuel elements. Heat is generated in the fuel within the fuel elements to subject the surfaces of the fuel elements to high temperatures, which under some circumstances causes fuel failure. When an element fails, fission products are released to the reactor coolant resulting in a very high increase in release rates of radioactivity of gas, liquid and solid wastes, and also creating an increase in maintenance activity resulting from an increase in radioactivity in the reactor coolant. It has been found that fuel element failures increase in severity with increased operation. Therefore, it is essential not only to locate and remove defective fuel elements during each refueling, but, also, to be able to do so economically and as rapidly as possible.

SUMMARY OF THE INVENTION

Apparatus for detecting reactor fuel element failure in which reactor coolant over a plurality of sealed fuel elements is displaced to increase the temperature of the fuel within the fuel elements for increasing the release of fission product isotopes in the reactor coolant about the plurality of fuel elements. Reactor coolant within or about the plurality of fuel elements is removed for sampling. A vial of material which increases the concentration of fission product isotopes seleced for detection is exposed to the removed reactor coolant and the vial is sensed for fission product isotopic concentration to detect the failure of the fuel elements under test.

A feature of the present invention is the sampling of a plurality of reactor fuel element assemblies simultaneously.

By virtue of the present invention, the period of time required for sampling an entire core can be substantially reduced with the result that greater accuracy can be achieved. It has been found that when an extended period of time is required to gain access for sampling and to remove the reactor coolant for sampling and to process the sampling, the concentrate of fission product isotopes will decay so that the detection of fission product isotope concentration therefrom is reduced to result in less accuracy.

Another feature of the present invention is the use of disposable vials at the sampling station containing chemicals to concentrate the fission product, such as getter, for improved sampling concentration to increase reliability of the measurement of radioactivity.

DESCRIPTION OF THE DRAWINGS

FIG. 2 is a fragmentary diagrammatic end elevation view of the sampling station of the apparatus illustrated in FIG. 1.

FIG. 3 is a fragmentary diagrammatic side elevation view of the sampling station illustrated in FIG. 2.

FIG. 4 is a fragmentary horizontal section view of the apparatus shown in FIG. 1 taken along line 4—4 of FIG. 1.

FIG. 5 is a fragmentary vertical section view of the apparatus shown in FIG. 1 taken along line 5—5 of FIG. 4.

Figure 1:
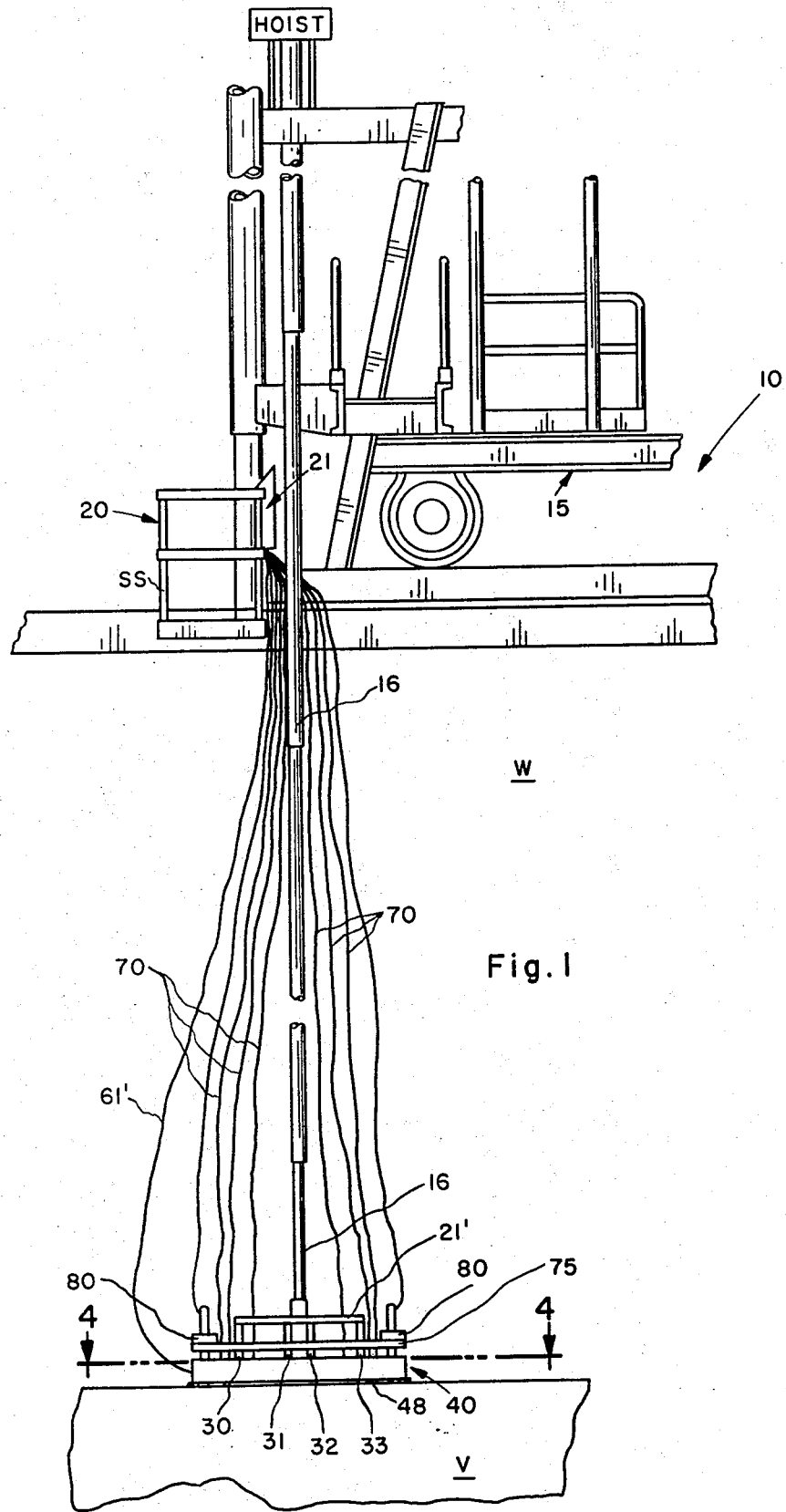
FIG. 1 is a fragmentary diagrammatic elevation view of the apparatus of the present invention illustrated in conjunction with a reactor well and a reactor pressure vessel.

Illustrated in FIG. 1 is the apparatus 10 of the present invention for detecting reactor fuel element failures, which comprises a refueling platform 15 of the type disclosed in my copending application, filed Apr. 13, 1971, Ser. No. 133,687, for Elevator For A Reactor Well And Equipment Storage Area. The refueling platform includes a rigid equipment grapple 16, which is also described in the aforementioned application. However, the apparatus 10 can be used with any refueling platform having a rigid grapple.

The refueling platform 15 is supported above a reactor well W in which is located a reactor pressure vessel V. The vessel V contains a core that houses a plurality of spaced fuel assemblies or bundles. Each fuel assembly comprises an array of sealed reactor fuel elements, which may be in the form of tubes, rods or plates. For convenience, the fuel elements will be referred to hereinafter as fuel elements with each element containing nuclear fuel such as uranium dioxide pellets. Reactor coolant, such as water, is disposed within the reactor well above the assemblies of fuel elements and reactor coolant, such as water, also flows in a continuously circulating path between the assemblies or bundles of fuel elements. While reference is made herein to reactor coolant, such as water, it is to be understood that heat generated by the reactor fuel is transferred to the coolant and the coolant not only serves to cool the fuel elements but also serves as an energy transfer medium for the operation of turbines for producing electric power in a nuclear power plant. The fuel elements are grouped together at fixed distance between groups or bundles in a coolant flow channel and a plurality of assemblies or bundles of fuel elements form the nuclear reactor core.

On the refueling platform 15 is an elevator service platform 20, a portion of which constitutes a sampling station SS (FIGS. 2 and 3). A sampling console 21 is located at the sampling station SS which will be described hereinafter.

The equipment grapple 16 extends downwardly from the refueling platform 15 so that its distal end projects into the reactor vessel V and above fuel element assemblies A1–A4 (FIGS. 4 and 5). The number of fuel element assemblies, in the preferred embodiment, will be in excess of four and preferably in multiples of four. Such fuel element assemblies can be tested simultaneously for defective leaking fuel elements. A horizontally disposed arm 21' is carried by the distal end of the equipment grapple 16 in parallel relation with the upper surface of the assemblies of sealed fuel elements A1–A4. Columns 30–33 (FIGS. 1 and 5) depend from the arm 21' in fixed relation thereto. Carried by the free ends of the columns 30–33 is an enclosure or test chamber 40 (FIG. 5) of preferably stainless steel for a plurality of assemblies of sealed fuel elements A1–A4 to be sampled for fuel element failures.

The test chamber 40 comprises a suitable housing 45 which includes a horizontally disposed top wall 46 fixed to the columns 30–33. Depending from the top wall 46 are upright walls 47 which have their lower ends terminating at the upper end of the assemblies of fuel elements A1–A4 in temporary sealing engagement with the core grid CG of the reactor vessel V by suitable compressible seals 48 to form a water or liquid tight seal about the assemblies of fuel elements A1–A4.

Anchored to and depending from the top and side walls 46, 47 of the housing 45 are conventional fuel grapples 51–54 (FIGS. 4, 5), which serve to lock the housing 45 to the fuel assemblies A1–A4 after the housing has been sealed to the core grid. The fuel grapples 51–54 are hydraulically operated (for example by air cylinders not shown) for connection to and disconnection from the fuel bales 50 which form a part of the fuel assemblies A1–A4 and are used to lift same from the core when replacement is desired. Guide members 60–61, which are also part of the housing 45 and are provided with tapered surfaces leading to slots to receive the bales 50, serve to position the housing 45 over and with respect to the assemblies of fuel elements A1–A4 to enable sipper tubes 72, to be later described, to be positioned over coolant flow openings in the upper tie plates A1″–A4″ which conventionally serve to hold and fix the positions of the fuel elements within each assembly. The grapples 51–54 are conventional and well-known in the art, such as the grappling mechanism manufactured by the General Electric Company.

At the upper end of the test chamber 40 are suitable air transfer conduits 60′, which are connected to flexible air hoses 61′, respectively (FIGS. 1 and 5). The other end of the hoses 61′ are connected to the console 21, which controls the flow of air under pressure from a supply of air under pressure, not shown, through the hoses 61′, the conduits 60′ and into the test chamber 40. A suitable number of air conduits 60′ and hoses 61′ are provided to displace the reactor coolant contained in the housing 45 initially above the fuel tube assemblies A1–A4, to a level $W_1$ (FIG. 5) below the upper end of the fuel assembly housing A1′–A4′ and above the sealing surface of the test chamber 40 as shown by the seal 48. In conventional fuel assembly housings there are openings in the lower sections thereof through which coolant flows in usual flow out paths. When air is conducted into the housing 45, coolant will flow through the openings formed in the lower sections of the fuel assembly housings into the reactor core region.

By displacing the reactor coolant above the assemblies of reactor elements A1–A4 and by regulating the circulation of coolant between the assemblies of fuel elements A1–A4, the temperature of the fuel is increased which results in the increase of fission product isotopes released to the coolant. The heated fuel discharges fission product isotopes through a defective fuel element causing through the defect in the fuel element cladding an increase in concentration of fission product isotopes including for example Isotope I 131 in the reactor coolant isolated respectively between the assemblies of fuel elements A1–A4. This does not occur when a fuel element is not defective. Thus, the reactor coolant isolated within the fuel element assemblies is exposed to increased fission product isotope concentration when a fuel element within a given fuel element assembly is defective.

Connected to the console 21 are a plurality of flexible sampling tubes 70, which communicate with a suitable vacuum chamber 71 (FIG. 2) under the control of the console 21. At the distal end of the sampling tubes 70, which may be made of plastic material, are rigid tubes 72, respectively (FIG. 5). The rigid tubes 72 are received by openings 73 in the top wall 46 of the housing 45. O-rings 74 maintain a seal between the tubes 72 and the top wall 46. The rigid tubes 72 are fixed to a horizontal plate 75 for vertical movement therewith. Vertical movement of the plate 75 is controlled by a hydraulic system 80. Hydraulic system piston rods 81 received by respective openings 82 in the plate 75 and fixed to the top plate 46 guide the plate 75 for vertical movement. After the test chamber 40 with the plate 75 raised is positioned over the assemblies A1–A4 of fuel elements A1′–A4′, the hydraulic system 80 lowers the plate 75 to extend the distal ends of the rigid tubes 72 through the aligned coolant openings normally present in the top closure plate A1‴–A4‴ respectively, below the top plates A1″–A4″ of each of the assemblies A1′–A4 of fuel elements A1′–A4″ to place the distal ends of the rigid tubes 72 below the top plates A1″–A4″ of each of the assemblies A1–A4 of fuel elements A1′–A4′, respectively. There is a rigid tube 72 associated with each assembly of fuel elements, respectively.

The rigid tube ends are placed below the top plates A1″–A4″ for the fuel element assemblies A1–A4, respectively, so as to enable the reactor coolant below each top plate A1″–A4″ to be sampled for the respective fuel element assemblies A1–A4.

After the fuel elements A1′–A4′ of the assemblies A1–A4 have had sufficient time to heat following lowering of the water level, the console 21 is operated so that the tubes 72 draw reactor water from within the respective assemblies A1–A4 of fuel elements A1′–A4′ into the flexible conduits 70 for advancement into the console 21.

Within the console 21 are disposed vials 90–93 of material for concentrating fission product isotopes, such as iodine getter material. There is a vial for each assembly A1–A4 of fuel elements A1′–A4′ under test. Each vial 90–93 is filled with a material that concentrates the selected fission product isotopes. The vials 90–93 are disposable and are constructed to be received by a conventional gamma scanner with multichannel analyzer (not shown) of the type manufactured by Nuclear Chicago Company. The scanner is mounted at the sampling station SS. Each sample of reactor coolant advanced by flexible conduits 70 is conducted, respectively, through its associated vial 90–93 for several minutes to expose the same to fission product isotopes. Each vial is removed manually from the console 21 and placed manually in the gamma scanner. Of course, appropriate protective equipment is employed. The gamma scanner of the type described includes a counter to give an automatic numerical reading. The gamma scanner gives a count of the concentration of selected fission product isotope of the sampled coolant for detecting the failure or lack of failure of fuel elements within an assembly of fuel elements.

I claim:

1. Apparatus for detecting the failure of a sealed reactor fuel element in an assembly of fuel elements disposed in reactor coolant and in which said fuel assembly has an upper end containing openings for coolant flow, comprising a test chamber for disposal over the upper end of said assembly in liquid-tight relation therewith, means for displacing the coolant in said chamber above said assembly whereby said fuel elements become heated for increasing the release of fission products from failed fuel elements into the coolant, means for removing a sample of the coolant from within the fuel assembly at a location below the said assembly upper end, said coolant sample removal means comprising a rigid conduit extending through said chamber and having a length enabling extension of the free end of said conduit through a coolant flow opening in the assembly upper end, a station located outside the test chamber for analysis of the sample for the presence of fission products, means for carrying the coolant sample to the analysis station, a platform above said test chamber, and a rigid grapple depending from said platform and supporting said chamber for movement into sealing relationship with the fuel assembly.

2. Apparatus as claimed in claim 1, wherein the sample analysis station is located on the platform, and means are provided for carrying the sample from the rigid conduit up to the platform.

3. Apparatus for detecting fuel element failure in a plurality of assemblies of fuel elements disposed in reactor coolant and in which each fuel assembly comprises an upper end containing openings for coolant flow, comprising a test chamber for disposal over the upper end of said assemblies in liquid-tight relation therewith, means for displacing the coolant in said chamber above said assemblies whereby said fuel elements become heated for increasing the release of fission products from failed fuel elements into the coolant, means associated with each of said plurality of assemblies for removing substantially simultaneously coolant samples from within the associated fuel assembly and below its upper end, said coolant sample removal means comprising a plurality of rigid conduits, a common member supporting said rigid conduits, and means for vertically moving the common member with respect to the test chamber.

4. Apparatus for detecting the failure of a sealed reactor fuel element in an assembly of fuel elements disposed in reactor coolant and in which the fuel assembly comprises an upper end containing openings for coolant flow, comprising a test chamber for disposal over the upper end of said assembly in liquid-tight relation therewith, means for displacing the coolant in said chamber above said assembly whereby said fuel elements become heated for increasing the release of fission products from failed fuel elements into the coolant, means for removing a sample of the coolant at a location below the said assembly upper end, said coolant sample removal means comprising a rigid conduit extending through said chamber and having a length enabling extension of the free end of said conduit through a coolant flow opening in the assembly upper end, means for vertically moving said rigid conduit relative to the test chamber and the fuel assembly, said fuel assembly having a bale for lifting same, and means in the chamber for engaging the bale and for aligning said test chamber by means of the bale relative to the fuel assembly such that the rigid conduit is aligned with a coolant flow opening in the assembly upper end.

5. Apparatus as claimed in claim 4, wherein the test chamber comprises at least one internal grapple for connection to the fuel assembly.

* * * * *